United States Patent
Teague et al.

(10) Patent No.: US 12,554,038 B2
(45) Date of Patent: Feb. 17, 2026

(54) METHODS AND MEANS FOR SIMULTANEOUS CASING INTEGRITY EVALUATION AND CEMENT INSPECTION IN A MULTIPLE-CASING WELLBORE ENVIRONMENT

(71) Applicant: Visuray Intech Ltd (BVI), Tortola (VG)

(72) Inventors: Philip Teague, Houston, TX (US); Alex Stewart, San Francisco, CA (US)

(73) Assignee: Visuray Technology Ltd, Sliema (MT)

( * ) Notice: Subject to any disclaimer, the term of this patent is extended or adjusted under 35 U.S.C. 154(b) by 0 days.

(21) Appl. No.: 18/109,940

(22) Filed: Feb. 15, 2023

(65) Prior Publication Data

US 2023/0194748 A1 Jun. 22, 2023

Related U.S. Application Data

(63) Continuation of application No. 17/383,058, filed on Jul. 22, 2021, now abandoned, which is a continuation of application No. 16/162,824, filed on Oct. 17, 2018, now abandoned.

(60) Provisional application No. 62/573,401, filed on Oct. 17, 2017.

(51) Int. Cl.
*G01V 5/12* (2006.01)
*E21B 47/005* (2012.01)
*G01V 5/10* (2006.01)

(52) U.S. Cl.
CPC .............. *G01V 5/12* (2013.01); *E21B 47/005* (2020.05); *G01V 5/104* (2013.01)

(58) Field of Classification Search
CPC ........... G01V 5/12; G01V 5/104; E21B 47/01
See application file for complete search history.

(56) References Cited

U.S. PATENT DOCUMENTS 3,612,865 A * 10/1971 Walker .................. G01T 1/2985
250/363.04
3,668,619 A * 6/1972 Dennis ................ E21B 47/0025
315/391

(Continued)

FOREIGN PATENT DOCUMENTS

GB 2497857 A * 6/2013 ............. E21B 43/04
WO 2016153523 A1 9/2016

*Primary Examiner* — Blake C Riddick
(74) *Attorney, Agent, or Firm* — Adams & Reese LLP; John Henry Scott, III

(57) ABSTRACT

An x-ray based cement evaluation tool for measurement of the density of material volumes within single, dual and multiple-casing wellbore environments is provided, wherein the tool uses x-rays to illuminate the formation surrounding a borehole, and a plurality of detectors are used to directly measure the density of the cement annuli and any variations in density within The tool uses x-rays to illuminate the casing surrounding a borehole and a plurality of multi-pixel imaging detectors directly measure the thickness of the casing The tool includes an internal length having a sonde section, wherein the sonde section further includes an x-ray source; a radiation shield for radiation measuring detectors; sonde-dependent electronics; and a plurality of tool logic electronics and PSUs. Other systems and subsystems appropriate for carrying out the foregoing are also disclosed, as are a plurality of example methods of use therefor.

18 Claims, 4 Drawing Sheets

(56) References Cited

U.S. PATENT DOCUMENTS

| | | | | |
|---|---|---|---|---|
| 4,386,422 A * | 5/1983 | Mumby | ............... | E21B 47/22 367/83 |
| 5,012,091 A * | 4/1991 | Moake | ............... | G01V 5/12 250/269.3 |
| 6,281,801 B1 * | 8/2001 | Cherry | ............... | G01N 22/04 73/61.41 |
| 2003/0042426 A1 * | 3/2003 | McGregor | ............... | G01V 5/02 250/393 |
| 2003/0136916 A1 * | 7/2003 | Kearfott | ............... | G01V 5/02 250/394 |
| 2008/0061225 A1 * | 3/2008 | Orban | ............... | G01V 5/125 250/269.3 |
| 2009/0072767 A1 * | 3/2009 | Ernst | ............... | H05H 7/02 315/504 |
| 2009/0266609 A1 * | 10/2009 | Hall | ............... | E21B 47/00 175/45 |
| 2010/0004867 A1 * | 1/2010 | Zhou | ............... | G01V 5/12 250/269.3 |
| 2010/0017134 A1 * | 1/2010 | Steinman | ............... | G01V 5/125 250/363.01 |
| 2010/0044105 A1 * | 2/2010 | Faircloth | ............... | E21B 10/60 175/16 |
| 2011/0251794 A1 * | 10/2011 | Bittar | ............... | G01V 3/30 702/11 |
| 2011/0284732 A1 * | 11/2011 | Korkin | ............... | E21B 47/005 250/269.1 |
| 2011/0285398 A1 * | 11/2011 | Villegas | ............... | E21B 47/01 324/326 |
| 2013/0243375 A1 * | 9/2013 | Poisel | ............... | G02B 6/36 385/26 |
| 2013/0287174 A1 * | 10/2013 | Zhou | ............... | H01J 35/116 378/143 |
| 2013/0308753 A1 * | 11/2013 | Groves | ............... | G01T 7/005 378/54 |
| 2015/0168593 A1 * | 6/2015 | Simon | ............... | G01V 5/12 250/261 |
| 2016/0061991 A1 * | 3/2016 | Berkcan | ............... | G01V 5/145 250/269.2 |
| 2016/0161385 A1 * | 6/2016 | Lexa | ............... | G01V 5/12 702/6 |
| 2016/0282505 A1 * | 9/2016 | Lee | ............... | G01V 5/125 |
| 2017/0045640 A1 * | 2/2017 | Zhang | ............... | G01V 5/12 |
| 2020/0182052 A1 * | 6/2020 | Hu | ............... | E21B 47/0025 |

\* cited by examiner

METHODS AND MEANS FOR SIMULTANEOUS CASING INTEGRITY EVALUATION AND CEMENT INSPECTION IN A MULTIPLE-CASING WELLBORE ENVIRONMENT

CROSS-REFERENCES TO RELATED APPLICATIONS

This patent application claims benefit of U.S. patent application Ser. No. 17/383,058, filed Jul. 22, 2021, which claims benefit of U.S. patent application Ser. No. 16/162,824, filed Oct. 17, 2018, which claims the benefit of U.S. Provisional Patent Application No. 62/573,401, filed Oct. 17, 2017, the contents of which are hereby incorporated by reference in their entirety.

TECHNICAL FIELD

The present invention relates generally to methods and means for detecting anomalies in annular materials, and in a particular though non-limiting embodiment to methods and means for detecting anomalies in the annular materials of single and dual casing string environments and measuring the integrity of the casing immediately surrounding the tool.

BACKGROUND

Within the oil and gas industry, it is important to be able to gauge the quality of cement through multiple casings, as is the ability to determine the status of the annuli. The industry currently employs various methods for the verification of the hydraulic seal behind a single casing string. Typically, ultrasonic tools are run within the well in order to determine whether cement is bonded to the outside of the casing, thereby indicating the presence of cement in the annulus between the casing and formation, or between the casing and an outer casing. Ultimately, a pressure test is required to ensure that zonal isolation has been achieved as ultrasonic tools are highly dependent upon quality of the casing, the bond between the casing and the material in the annulus, and the mechanical properties of the material in the annulus to be able to work correctly. In addition, since ultrasonic tools treat the material in the annulus as a single isotropic and homogenous volume, any actual deviation away from this ideal leads to inaccuracies in the measurement.

Current tools can offer information regarding the cement bond of the inner-most casing, yet lack the ability to discriminate between and amongst various depths into the cement or annular material. This limitation means that fluid migration paths may exist at the cement-formation boundary, within the cement itself, or between the casing and an outer casing, thereby leading to a loss of zonal isolation. In addition, the ability to resolve the mechanical and structural integrity of the aforementioned casing is currently reliant upon the use of mechanical calipers that are deployed separately to any cement evaluation techniques. The mechanical calipers provide an operator with a geometric measurement of the inner diameter of the innermost casing, and assume that the outer-diameter of the casing remains unaffected by corrosion, remaining consistent with API-standard pipe diameters.

No viable technologies are currently available which are able to determine the radial and azimuthal position of anomalies within the annular region (up to the cement-formation boundary) to ensure that no fluid paths exist that may pose a risk to zonal isolation and well integrity, while simultaneously measuring the integrity of the casing.

Prior art teaches a variety of techniques that use x-rays or other radiant energy to inspect or obtain information about the structures within or surrounding the borehole of a water, oil or gas well, yet none teach methods or means capable of accurately analyzing the azimuthal and radial position of anomalies in the annular materials surrounding a wellbore in single or multi-string cased well environments. In addition, none teach of a method of accurately analyzing the azimuthal position of anomalies with a means which includes a centralized (non-padded) tool that is concentric with the well casing, rather than being a 'padded' tool that requires the source and detector assemblies to be in contact with said casing, much as with mechanical calipers when attempting to determine the integrity of the casing by assuming the material remaining in the thickness of materials of the casing.

U.S. Pat. No. 7,675,029 to Teague et al. teaches an apparatus that permits the measurement of x-ray backscattered photons from any horizontal surface inside of a borehole that refers to two-dimensional imaging techniques.

U.S. Pat. App No. 20180180765 by Teague et al. teaches an x-ray based cement evaluation tool for measurement of the density of material volumes within single, dual and multiple-casing wellbore environments.

U.S. Pat. No. 8,481,919 to Teague teaches a method of producing Compton-spectrum radiation in a borehole without the use of radioactive isotopes, and further describes rotating collimators around a fixed source installed internally to the apparatus, but does not have solid-state detectors with collimators. It teaches of the use of conical and radially symmetrical anode arrangements to permit the production of panoramic x-ray radiation.

U.S. Pat. No. 3,564,251 to Youmans discloses the use of a azimuthally scanning collimated x-ray beam that is used to produce an attenuated signal at a detector for the purposes of producing a spiral-formed log of the inside of a casing or borehole surface immediately surrounding the tool, effectively embodied as an x-ray caliper.

U.S. Pat. No. 7,634,059 to Wraight discloses an apparatus used to measure two-dimensional x-ray images of the inner surface inside of a borehole without the technical possibility to look inside of the borehole in a radial direction.

US 2013/0009049 by Smaardyk discloses an apparatus that allows measurement of backscattered x-rays from the inner layers of a borehole.

U.S. Pat. No. 8,138,471 to Shedlock discloses a scanning-beam apparatus based on an x-ray source, a rotatable x-ray beam collimator and solid-state radiation detectors enabling the imaging of only the inner surfaces of borehole casings and pipelines.

U.S. Pat. No. 5,326,970 to Bayless discloses a concept for a tool that aims to measure backscattered x-rays from inner surfaces of a borehole casing with the x-ray source being based on a linear accelerator.

U.S. Pat. No. 7,705,294 to Teague teaches an apparatus that measures backscattered x-rays from the inner layers of a borehole in selected radial directions with the missing segment data being populated through movement of the apparatus through the borehole. The apparatus permits generation of data for a two-dimensional reconstruction of the well or borehole, but the publication does not teach of the necessary geometry for the illuminating x-ray beam to permit discrimination of the depth from which the backscattered photons originated, only their direction.

U.S. Pat. No. 5,081,611 to Hornby discloses a method of back projection to determine acoustic physical parameters of the earth formation longitudinally along the borehole using a single ultrasonic transducer and a number of receivers distributed along the primary axis of the tool.

U.S. Pat. No. 6,725,161 to Hillis discloses a method of placing a transmitter in a borehole, and a receiver on the surface of the earth, or a receiver in a borehole and a transmitter on the surface of the earth, used to determine structural information regarding the geological materials between the transmitter and receiver.

U.S. Pat. No. 6,876,721 to Siddiqui discloses a method of correlating information taken from a core-sample with information from a borehole density log. The core-sample information is derived from a CT scan of the core-sample, whereby the x-ray source and detectors are located on the outside of the sample, and thereby configured as an "outside-looking-in" arrangement. Various kinds of information from the CT scan such as its bulk density is compared to and correlated with the log information.

U.S. Pat. No. 4,464,569 to Flaum discloses a method of determining the elemental composition of earth formations surrounding a well borehole by processing the detected neutron capture gamma radiation emanating from the earth formation after neutron irradiation of the earth formation by a neutron spectroscopy logging tool.

U.S. Pat. No. 4,433,240 to Seeman discloses a borehole logging tool that detects natural radiation from the rock of the formation and logs said information so that it may be represented in an intensity versus depth plot format.

U.S. Pat. No. 3,976,879 to Turcotte discloses a borehole logging tool that detects and records the backscattered radiation from the formation surrounding the borehole by means of a pulsed electromagnetic energy or photon source, so that characteristic information may be represented in an intensity versus depth plot format.

U.S. Pat. No. 9,012,836 to Wilson et al. discloses a method and means for creating azimuthal neutron porosity images in a wireline environment. Similar to U.S. Pat. No. 8,664,587, this reference discloses an arrangement of azimuthally static detectors which could be implemented in a wireline tool to assist an operator in interpreting logs post-fracking, by subdividing the neutron detectors into a plurality of azimuthally arranged detectors which are shielded within a moderator to infer directionality to incident neutrons and gamma.

U.S. Pat. No. 4,883,956 to Manente et al. discloses an apparatus and methods for investigation of subsurface earth formations using an apparatus adapted for movement through a borehole. Depending upon the formation characteristic or characteristics to be measured, the apparatus may include a natural or artificial radiation source for irradiating the formations with penetrating radiation such as gamma rays, x-rays or neutrons. The light produced by a scintillator in response to detected radiation is used to generate a signal representative of at least one characteristic of the radiation and this signal is recorded.

U.S. Pat. No. 6,078,867 to Plumb discloses a method of generating a three-dimensional graphical representation of a borehole, including at least the steps of receiving caliper data relating to the borehole, generating a three-dimensional wire mesh model of the borehole from the caliper data, and color mapping the three-dimensional wire mesh model from the caliper data based on either borehole form, rugosity and/or lithology.

U.S. Pat. No. 3,321,627 to Tittle discloses a system of collimated detectors and collimated gamma-ray sources to determine the density of a formation outside of a borehole, optimally represented in a density versus depth plot format. However, the reference fails to teach or suggest any method or means used to achieve such through a steel wall of a single or multiple well casings.

SUMMARY

An x-ray based cement evaluation tool for measurement of the density of material volumes, wherein the tool uses x-rays to illuminate a formation surrounding a borehole and a plurality of detectors are used to measure the density of the cement annuli and variations in density within is provided, the tool including at least: an internal length comprising a sonde section, wherein said sonde section further comprises an x-ray source; a radiation shield for radiation measuring detectors; sonde-dependent electronics; and a plurality of tool logic electronics and PSUs.

A method of x-ray based cement evaluation for measuring the density of material volumes within single, dual and multiple-casing wellbore environment is also provided, the method including at least: illuminating the formation surrounding a borehole using x-rays; using a plurality of detectors to measure the density of the cement annuli and any variations in density within; and illuminating the casing surrounding a borehole using x-rays and then using a plurality of multi-pixel imaging detectors to measure the thickness of the casing.

BRIEF DESCRIPTION OF SEVERAL EXAMPLE EMBODIMENTS

The methods and means described herein for simultaneous casing integrity evaluation, through x-ray backscatter imaging combined with x-ray-based cement inspection in a multiple-casing wellbore environment, is deployed in a package that does not require direct physical contact with the well casings (i.e., non-padded). Furthermore, the method and means employ an actuated combination of collimators, located cylindrically around an X-ray source within a non-padded concentrically-located borehole logging tool, together with a single or plurality of two dimensional per-pixel collimated imaging detector array(s) used in certain embodiments as the primary fluid/offset compensation detectors. The capability of actuation of the collimators permits the operator, the opportunity between a fixed collimator mode, that provides the output of an azimuthal array of a plurality of x-ray beams (from said x-ray source), or to select through actuation, a mode that produces a single or plurality of individual azimuthally arranged x-ray beams that 'scan' azimuthally, through the rotation of one of the collimators.

In one example embodiment, an electronic-source-based borehole logging tool [101] is deployed by wireline conveyance [104] into a cased borehole [102], wherein the density of materials surrounding the borehole [103] are measured by the tool. In a further embodiment, the tool is enclosed in a pressure housing, which ensures that well fluids are maintained outside of the housing.

Figure 1:
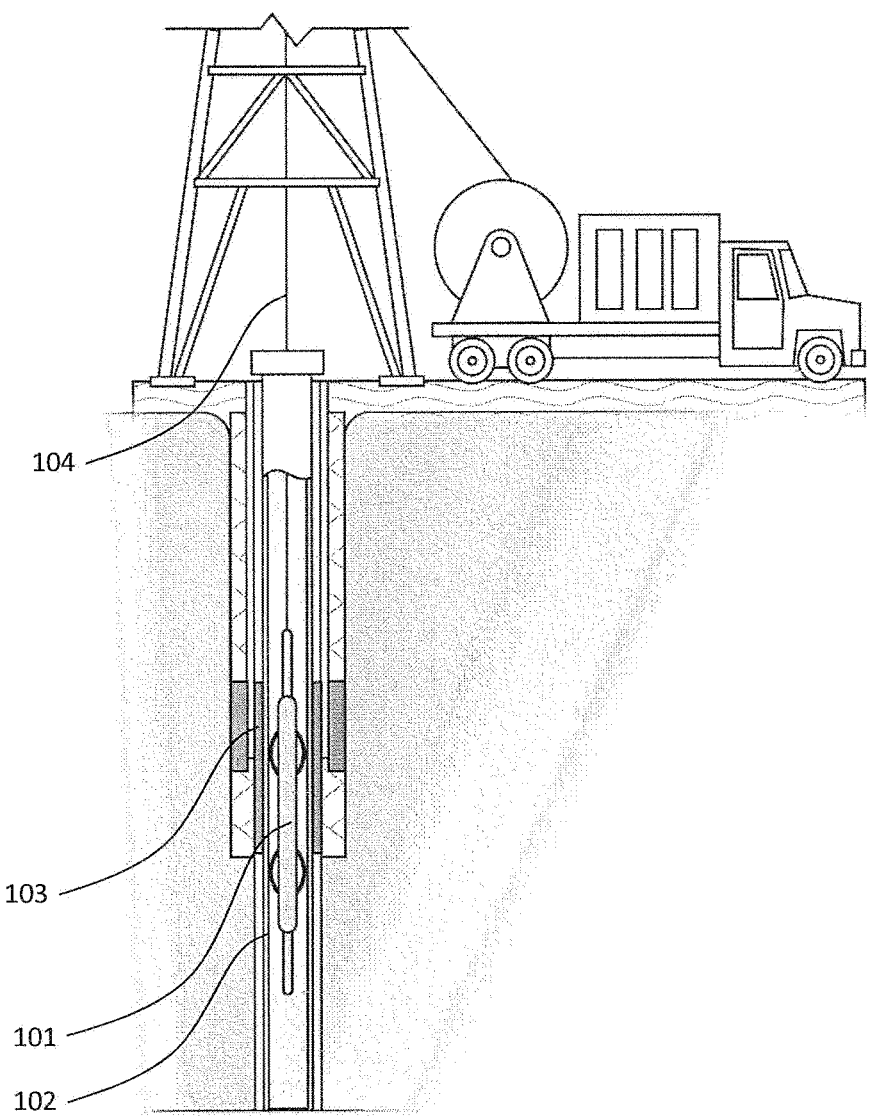
FIG. 1 illustrates an x-ray-based tool being deployed into a borehole via wireline conveyance. Regions of interest within the materials surrounding the borehole are also indicated.
Figure 2:
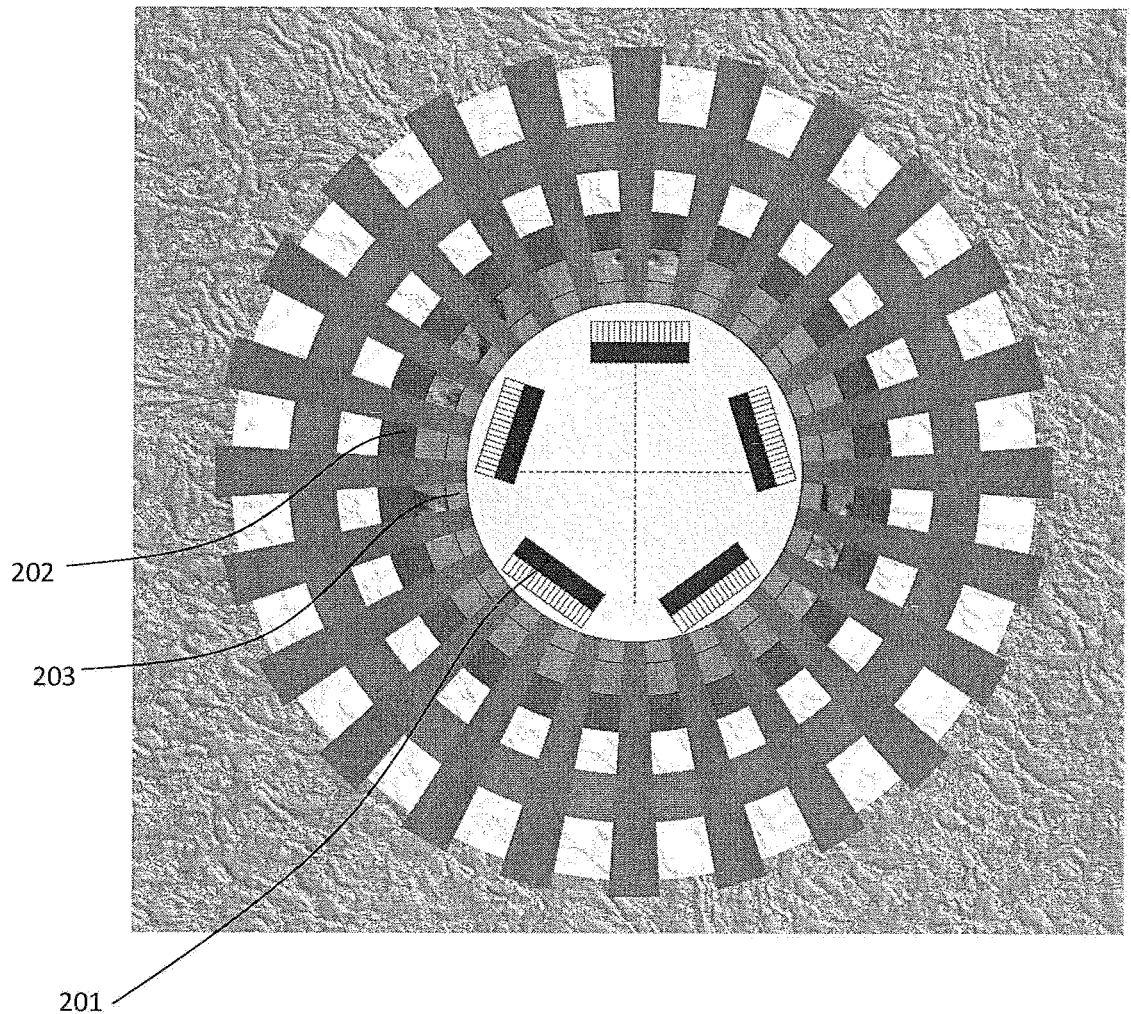
FIG. 2 illustrates one example of the azimuthal placement of near-field imaging detector arrays, arranged so as to enable imaging of the inner-most casing.

FIG. 2 further illustrates how an azimuthal plurality of per-pixel collimated two-dimensional detectors [201] can be used to create a plurality of two-dimensional images of the well casing [202] as the tool [203] is logged. The output from each pixel can be summated as a function of depth to provide tool offset (eccentricity) data which acts as a key-input into the fluid compensation of the detectors that possess a larger axial offset (cement evaluation detectors), and hence, a deeper depth of investigation into the materials surrounding the borehole.

Figure 3:
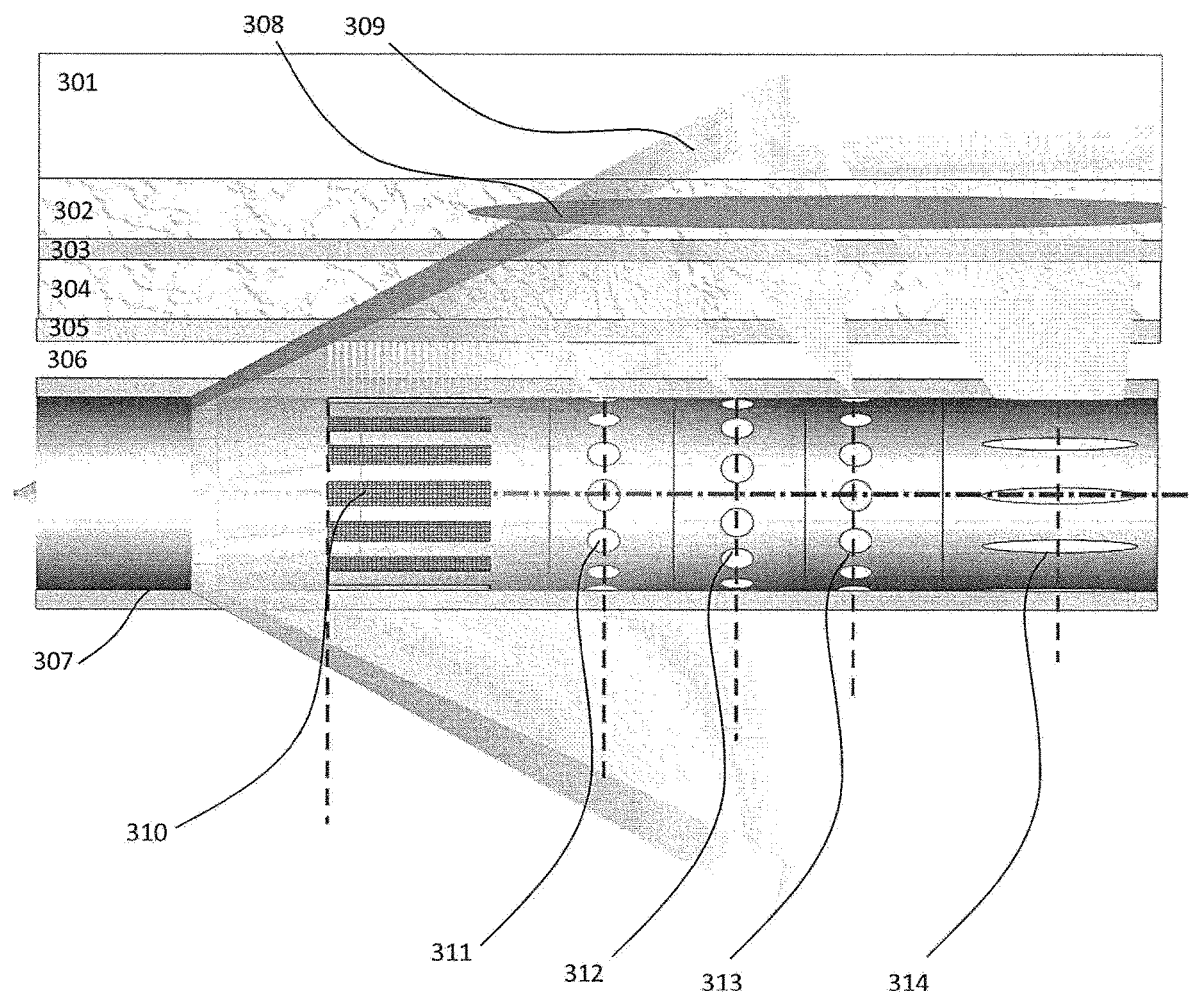
FIG. 3 illustrates one example of the axial placement of near-field imaging detector arrays, arranged so as to enable imaging of the inner-most casing while illuminated by a conical beam of x-ray, while an array of longer offset detectors interrogate the materials surrounding the borehole using the same conical x-ray beam.

FIG. 3 illustrates that as the x-ray beam [309] (shown as a cone) interacts with the media surrounding the tool [307] within the borehole [301, 302, 303, 304, 305], the counts that are detected at each axially offset group of detectors [310, 311, 312, 313, 314] is a convolution of the various attenuation factor summations of the detected photons as they travelled through and back through each 'layer' of the borehole surroundings [301, 302, 303, 304, 305]. The data each detector may be deconvoluted through the use of the data collected by the 1st order detector group [310], to compensate for fluid-thickness and casing variations alone. As the first order detector [310] is a per-pixel collimated imaging detector array, the detectors are also capable of creating backscatter images of the casing [305] itself. When the tool is actuated axially (through wireline logging) the images, collected as a function of axial offset/depth, can be tessellated to produce long two-dimensional x-ray backscatter images of the casing [305]. The backscatter images may also contain spectral information, such that a photo-electric or characteristic-energy measurement may be taken, such that the imaged material may be analyzed for scale-build up or corrosion, etc.

In one embodiment, cylindrical collimators are used to provide directionality to the output of an x-ray source located within the pressure housing of a borehole logging tool. An x-ray beam or plurality of beams, rotating azimuthally around the major axis of the bore tool, interacts with the annular materials surrounding the wellbore within a single or multi-string cased hole environment to produce both single and multi-scatter responses, depending upon the axial offset of a plurality of fixed detectors that are employed to measure the incoming photons resulting from said scatter. In a further embodiment, an azimuthal plurality of per-pixel collimated two-dimensional detectors can be used to create a plurality of two-dimensional images of the well casing as the tool is logged.

Figure 4:
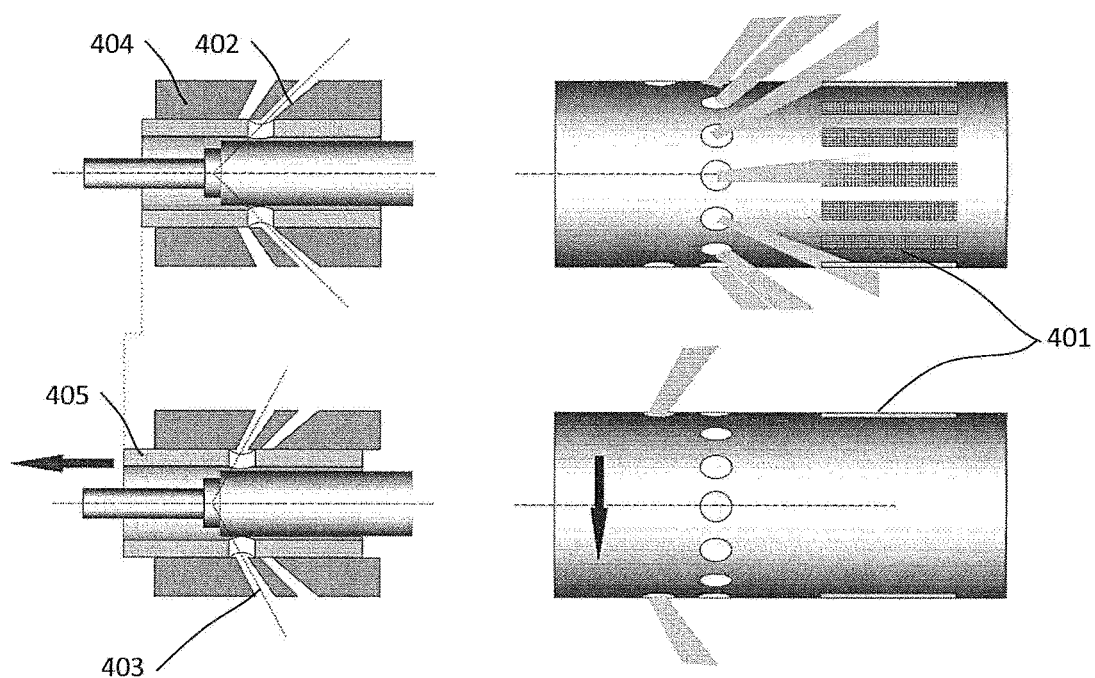
FIG. 4 illustrates how manipulation of an arrangement of collimators/shields can be used to select between a fixed plurality of x-ray beams, or a rotating set of x-ray beams, and further illustrates how the casing imaging detectors would be arranged.

FIG. 4 further illustrates the rotation of the collimator [404], which permits an increase of the discrete resolving power of the azimuthal location of density variations in the annular materials surrounding the wellbore in multi-string cased-hole environments. An axial plurality of fixed collimated detector-sets [401] can be used to measure the multiple-scatter signal resulting from the interaction of the beam with the casings and annular materials. The collimator sleeves [405] may be actuated to enable the selection of varying x-ray beam output modes [402, 403]. In one example of such an arrangement, a non-rotating plurality of azimuthally located x-ray beams [402] is provided, wherein each beam is accompanied by an axially-paired two dimensional per-pixel collimated imaging detector array [401]. In another example of such an arrangement, the axial actuation of one sleeve [405] and the rotation of another [404] produce a single or multi-element azimuthally rotating beam [403] (similar to a lighthouse). The azimuthal plurality of detectors [401] rotates with the source collimation sleeve, such that the result is a multi-helical ribbon image that can be re-formatted to create a complete image of the 360 degrees of the casing as a function of depth/axial-di stance.

In yet another embodiment, the collimators are used to provide directionality to the output of an x-ray source are square, formed tubes disposed within a shielding material. In a further embodiment, the collimators are used to give directionality to the output of an x-ray source are rectangular formed tubes within a shielding material.

In one embodiment, the output from each pixel is summated as a function of depth to provide tool offset (i.e., eccentricity) data which acts as a key-input into the fluid compensation of the detectors that possess a larger axial offset (cement evaluation detectors), and hence, a deeper depth of investigation into the materials surrounding the borehole.

In another embodiment, the backscatter images may also contain spectral information, such that a photo-electric or characteristic-energy measurement may be taken, such that the imaged material can be analyzed for scale-build up or casing corrosion, etc.

In a further embodiment, machine learning would be employed to automatically analyze the spectral (photo electric or characteristic energy) content of the images to identify key features, such as corrosion, holes, cracks, scratches, and/or scale-buildup.

In a further embodiment, the per-pixel collimated imaging detector array would be a single 'strip' array (i.e., one pixel wide) and multiple pixels long—the imaging result is a 'helical' ribbon image, that can be re-formatted to create a complete image of the 360 degrees of the casing as a function of depth/axial-distance.

In a further embodiment, the tool is maintained stationary in the well, and the source collimator would be rotated, the per-pixel collimated imaging detector array would be a single 'strip' array (i.e., one pixel wide) and multiple pixels long—the imaging result would be a 'cylindrical' ribbon image. Further passes of the rotating source/detector collimator could be accumulated such that the statistical accuracy (and therefore resolution) of the image is improved for each pass.

In a further embodiment, the tool is maintained stationary in the well, and the source collimator would be rotated, the per-pixel collimated imaging detector array would be a single 'strip' array i.e. one pixel wide, and multiple pixels long—the imaging result is a 'cylindrical' ribbon image. The tool could be moved axially (for example, by either a wireline-winch or with a stroker) and a new image set taken, such that a section of casing could be imaged by stacking cylindrical ribbon images/logs.

In a further embodiment still, machine learning is employed to automatically reformat (or re-tesselate) the resulting images as a function of depth and varying logging speeds or logging steps, such that the finalized casing and/or cement image is accurately correlated for azimuthal direction and axial depth, by comparing with CCL, wireline run-in measurements, and/or other pressure/depth data.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. An x-ray based borehole evaluation tool comprising:
an x-ray source;
a plurality of detectors that is offset from the x-ray source in an axial direction, the plurality of detectors to measure radial density variations within a region surrounding the tool using radiant energy emitted by the x-ray source positioned within a borehole, the plurality of detectors including a first detector and a second detector positioned between the first detector and the x-ray source in the axial direction, the first detector to measure density of an annular material surrounding the borehole using the radiant energy, and the second detector to measure a thickness of a casing defining the borehole using the radiant energy; and
an actuated combination of collimators with a first collimator and a second collimator that interacts with the first collimator to control an operating mode of the tool.

2. The tool of claim 1, wherein axial actuation of the first collimator controls rotation of the second collimator.

3. The tool of claim 1, wherein rotation of the second collimator causes azimuthal rotation of the radiant energy.

4. The tool of claim 1, wherein rotation of the second collimator increases a resolution of azimuthal density variation measurements by the plurality of detectors relative to non-rotation of the second collimator.

5. The tool of claim 1, further comprising a plurality of azimuthally distributed detectors inclusive of the second detector that are coupled to the second collimator, the plurality of azimuthally distributed detectors rotatable to create multi-helical ribbon images of the casing using incoming photons that correspond to azimuthal rotation of the radiant energy.

6. The tool of claim 1, wherein the actuated combination of collimators comprise a square formed tube within a shielding material.

7. The tool of claim 1, wherein the second detector comprises a per-pixel imaging detector array to create backscatter images of the casing using incoming photons that correspond to the radiant energy.

8. The tool of claim 7, wherein the backscatter images comprise spectral information for photoelectric measurement of the casing.

9. The tool of claim 1, wherein the first detector is to measure the density of the annular material surrounding the borehole using the radiant energy and eccentricity data generated using the second detector.

10. A method of using an x-ray based borehole evaluation tool, the method comprising:
emitting, using an x-ray source of the tool positioned within a borehole, radiant energy towards a region surrounding the tool;
causing axial actuation of a collimator of the tool to transition the tool between a first operating mode characterized by non-rotation of the radiant energy and a second operating mode characterized by azimuthal rotation of the radiant energy;
generating, by a detector array of the tool that is offset from the x-ray source in an axial direction, output data that characterizes radial density variations within the region using the radiant energy, the detector array including a first detector and a second detector positioned between the first detector and the x-ray source in the axial direction;
measuring density of an annular material surrounding the borehole in the region using a first subset of the output data generated by the first detector; and
measuring a thickness of a casing defining the borehole using a second subset of the output data generated by the second detector.

11. The method of claim 10, wherein the output data generated by the detector array characterizes azimuthal density variations within the region at a first resolution during the first operating mode of the tool and at a second resolution greater than the first resolution during the second operating mode of the tool.

12. The method of claim 10, wherein the collimator is an actuated combination of collimators with a first collimator and a second collimator surrounding the first collimator.

13. The method of claim 12, further comprising:
controlling azimuthal rotation of second collimator using axial actuation of the first collimator.

14. The method of claim 12, further comprising:
causing azimuthal rotation of the radiant energy using azimuthal rotation of the second collimator.

15. The method of claim 10, further comprising:
creating, by a per-pixel imaging detector array of the second detector, a backscatter image of the casing using incoming photons that correspond to the radiant energy, the backscatter image comprising spectral information for photoelectric measurement of the casing.

16. The method of claim 15, wherein the per-pixel imaging detector array is a single strip array that is one pixel wide and multiple pixels long, and the backscatter image is a helical ribbon image.

17. The method of claim 16, further comprising:
reformatting the helical ribbon image to create a 360-degree image of the casing as a function of radial depth and axial distance.

18. The method of claim 10, wherein measuring the density of the annular material comprises:
deconvoluting the first subset of output data using the second subset of output data for fluid compensation.

* * * * *